(12) United States Patent
Miya (10) Patent No.: US 7,157,906 B2
(45) Date of Patent: *Jan. 2, 2007

(54) DOUBLE VARIABLE RELUCTANCE RESOLVER FOR A MULTIPLE SPEED RESOLVER SYSTEM

(75) Inventor: Taiichi Miya, Tokyo (JP)

(73) Assignee: Minebea Co., Ltd., Nagano-Ken (JP)

( * ) Notice: Subject to any disclaimer, the term of this patent is extended or adjusted under 35 U.S.C. 154(b) by 177 days.

This patent is subject to a terminal disclaimer.

(21) Appl. No.: 10/832,470

(22) Filed: Apr. 27, 2004

(65) Prior Publication Data

US 2004/0263014 A1    Dec. 30, 2004

(30) Foreign Application Priority Data

Apr. 28, 2003    (JP)    ............... 2003-123834

(51) Int. Cl.
*G01B 7/30* (2006.01)
*G05B 1/06* (2006.01)
*H01F 5/00* (2006.01)

(52) U.S. Cl. .................... 324/207.25; 324/207.17; 318/661

(58) Field of Classification Search ........... 324/207.25, 324/207.22, 166, 167, 176, 178, 207.17, 324/207.15; 318/661, 664; 310/168, 169, 310/170, 114, 156.47, 156.4

See application file for complete search history.

(56) References Cited

U.S. PATENT DOCUMENTS

| | | | |
|---|---|---|---|
| 4,255,682 A | | 3/1981 | Toida et al. |
| 4,481,468 A | * | 11/1984 | Ono et al. .................. 324/163 |
| 4,604,575 A | * | 8/1986 | Shimizu et al. ......... 324/207.18 |
| 5,032,750 A | * | 7/1991 | Hayashi ..................... 310/83 |
| 5,189,353 A | * | 2/1993 | Ezuka ........................ 318/605 |
| 5,444,368 A | * | 8/1995 | Horber .................. 324/207.16 |
| 5,652,493 A | * | 7/1997 | Hendershot, Jr. ........... 318/701 |
| 5,719,496 A | | 2/1998 | Wolf |
| 5,763,976 A | * | 6/1998 | Huard ........................ 310/168 |
| 5,764,767 A | * | 6/1998 | Beimel et al. .............. 713/180 |
| 6,107,794 A | | 8/2000 | Kipp et al. |
| 6,243,023 B1 | * | 6/2001 | Katagiri ................. 340/870.03 |
| 6,930,423 B1 | * | 8/2005 | Kitazawa .................... 310/168 |
| 2001/0015588 A1 | | 8/2001 | Maestre |
| 2003/0090223 A1 | * | 5/2003 | Nishizawa et al. ......... 318/268 |
| 2003/0145663 A1 | | 8/2003 | Heisenberg et al. |
| 2004/0025357 A1 | | 2/2004 | Schroder |

FOREIGN PATENT DOCUMENTS

| | | |
|---|---|---|
| EP | 1 473 548 | 11/2004 |
| JP | A-2000-018968 | 1/0000 |
| JP | U-03-002262 | 1/1991 |
| JP | A-2001-197610 | 7/2001 |

OTHER PUBLICATIONS

European Search Report issued on Nov. 23, 2005 from the European Patent Office for the corresponding European patent application No. 04010094.3-2213.
European Search Report issued on May 18, 2005 from the European Patent Office for the corresponding European patent application No. 04019290.8-2213.

* cited by examiner

*Primary Examiner*—Michael Cygan
*Assistant Examiner*—Kenneth J. Whittington
(74) *Attorney, Agent, or Firm*—Adduci, Mastriani & Schaumberg, L.L.P.

(57)    ABSTRACT

A double variable reluctance resolver in which a redundancy is given to a variable reluctance resolver to improve reliability. The double variable reluctance resolver also functions as a multiple speed resolver system.

23 Claims, 9 Drawing Sheets

DOUBLE VARIABLE RELUCTANCE RESOLVER FOR A MULTIPLE SPEED RESOLVER SYSTEM

CROSS REFERENCE TO RELATED APPLICATION

This application is based on and incorporates by reference Japanese Patent Application No. 2003-123834, which was filed on Apr. 28, 2003.

BACKGROUND OF THE INVENTION

The present invention relates to a double variable reluctance resolver and a multiple speed resolver system that includes redundant variable reluctance resolvers (or VR resolvers) to improve reliability.

In general, redundancy has been provided to improve the safety and reliability of the VR device. With rotation detection sensors in particular, redundant resolvers have been employed as shown in Japanese Unexamined Patent Application Publication 2001-197610. Two resolvers are structured for a master controller so that they provide redundancy. When one of the resolvers experiences an abnormality, the resolver with the abnormality is released from the control system and the master controller continuously functions using the remaining resolver. However, the structure, position and assembly of the two resolvers are unclear from the drawings, and consequently, the control mechanism for the synchronized operation of the two resolvers is unclear.

Figure 7A:
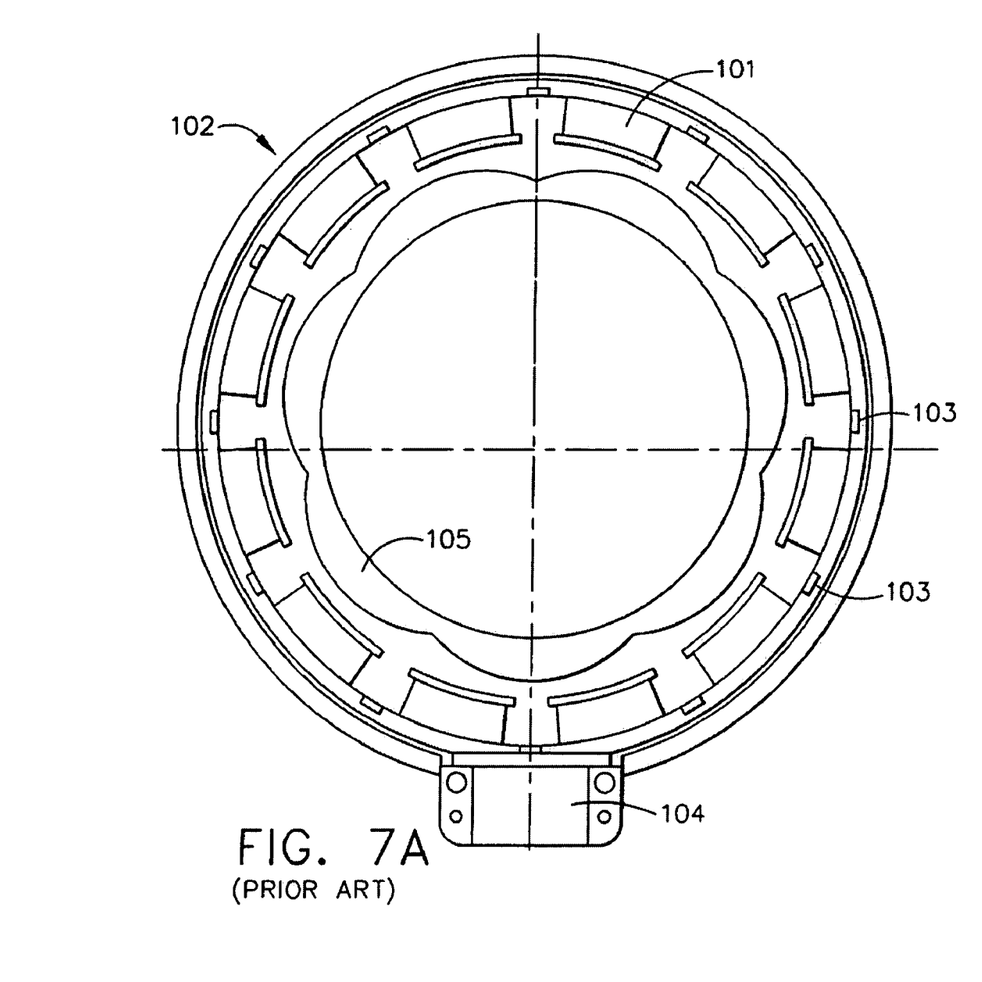
FIG. 7A is a diagrammatic end view of a resolver according to the prior art.
Figure 7B:
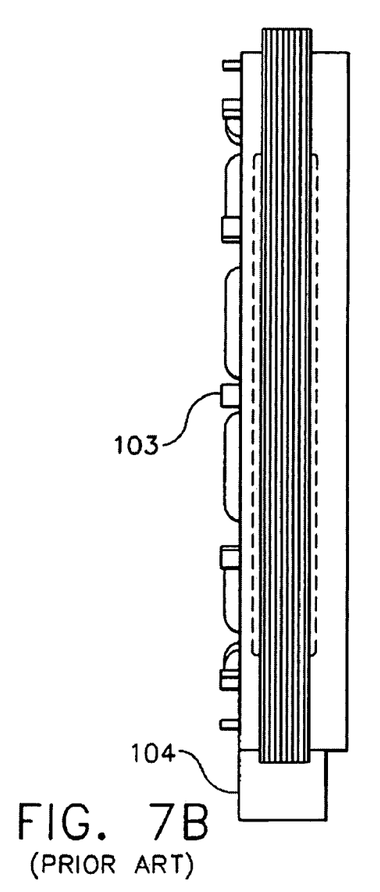
FIG. 7B is diagrammatic side view of the resolver of FIG. 7A.

As shown in FIG. 7A, a stator winding 101 is formed on each magnetic pole mounted on a stator yoke 102 via a crossover hook 103 in a serial manner. The ends of the stator winding 101 are attached to a connector 104. The salient poles of the rotor 105 are formed in a shape that produces appropriate changes in gap permeance when the rotor 105 rotates. Therefore, the amplitude of the output signal of the stator winding 101 changes and is represented by a sine wave. The circumference of the gap corresponds to one cycle. The number of salient poles of the rotor 105 is seven in the example of FIG. 7A.

Figure 5A:
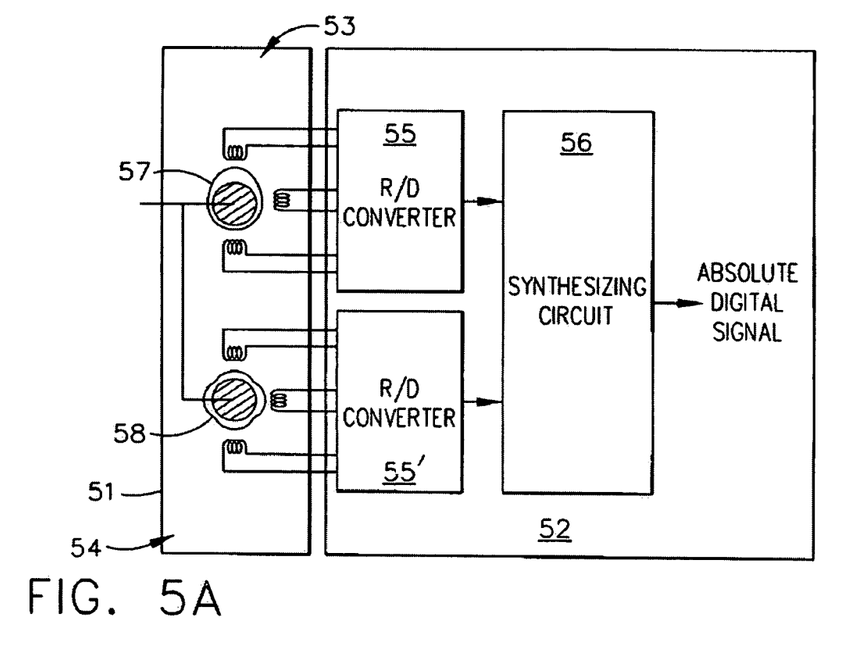
FIG. 5A is a block diagram of a multiple speed resolver system according to a fifth embodiment of the invention.
Figure 6A:
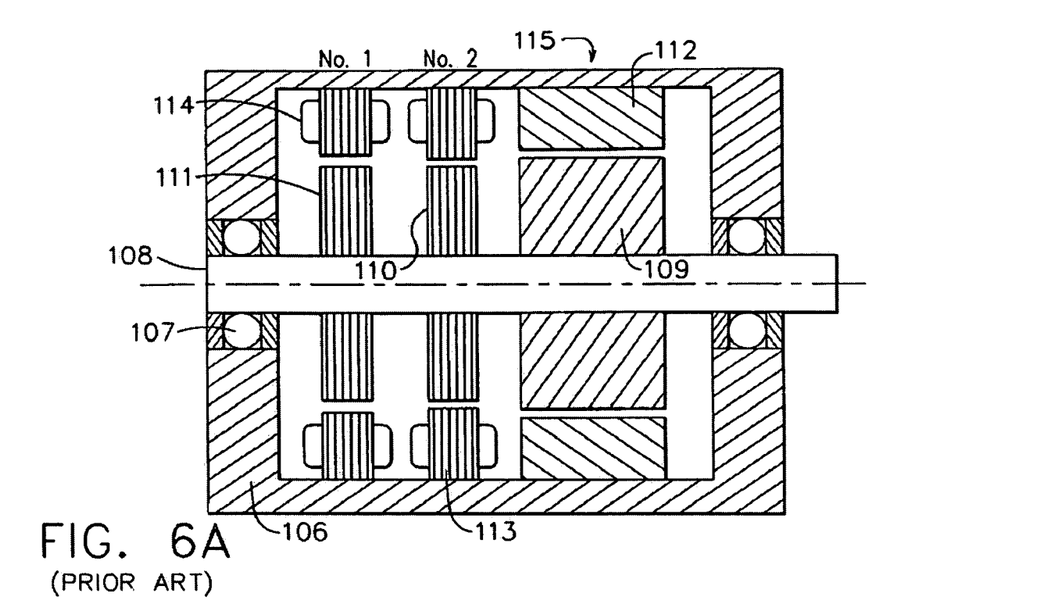
FIG. 6A is a cross-sectional view of redundant VR resolvers of the prior art assembled in a motor.

Japanese Unexamined Patent Application Publication 2000-018968 shows the structure and position of a resolver that incorporates redundancy. In FIGS. 5A and 6A, structures are shown in which two stators are spaced apart in the axial direction.

Figure 6B:
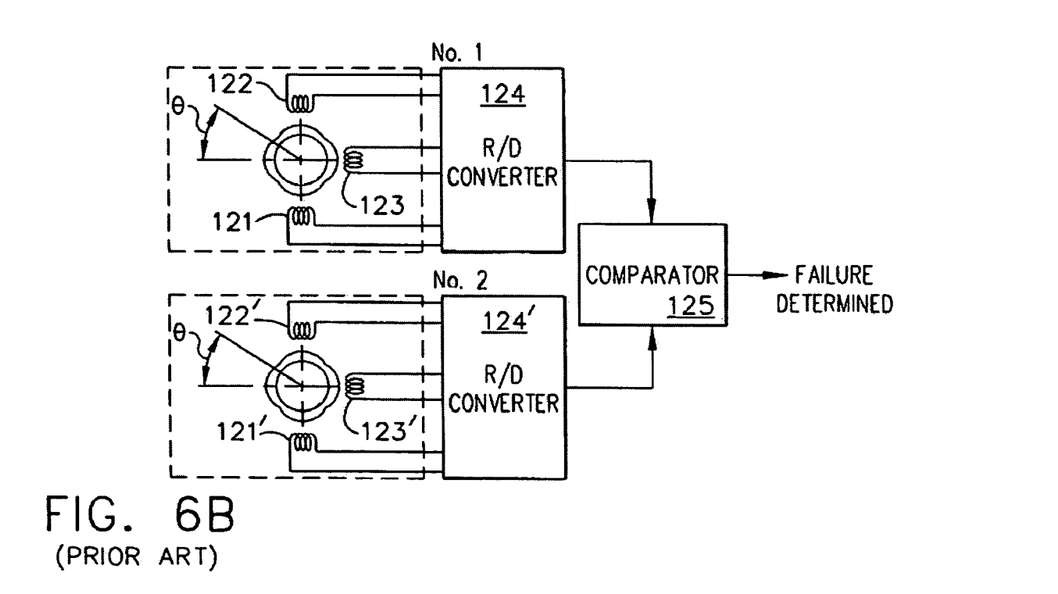
FIG. 6B is a schematic diagram of the prior art redundant VR resolvers of FIG. 6A.
Figure 6C:
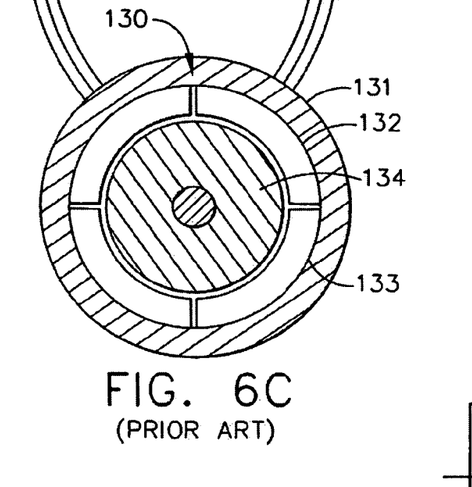
FIG. 6C is a diagram of a double VR resolver according to the prior art.
Figure 6D:
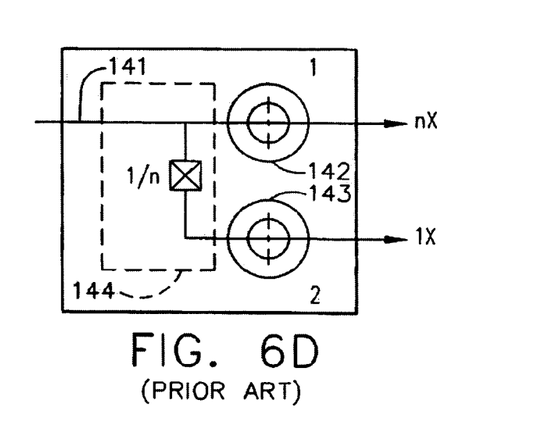
FIG. 6D is a schematic diagram of the prior art multiple speed resolver system of FIG. 6C, which includes a gear system.
Figure 6E:
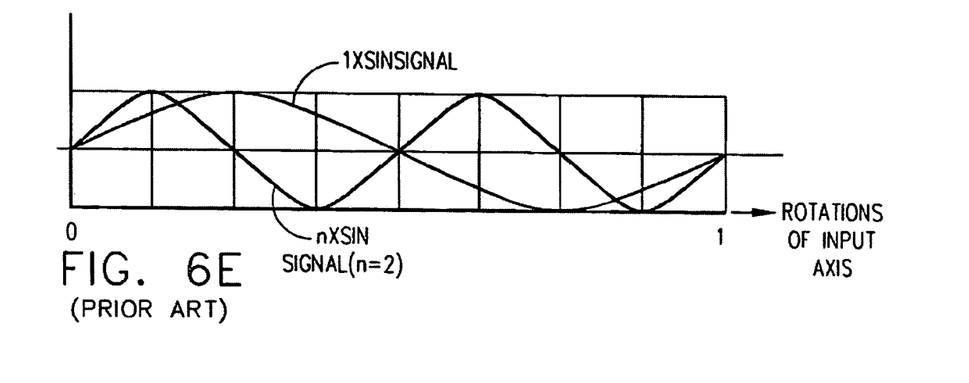
FIG. 6E is a graph of the relationship between the output signals of the double VR resolvers of FIG. 6D.

A structure having two stators assembled in a prior art motor is shown in FIG. 6A. FIG. 6B is a schematic view of the double resolver system of FIG. 6A. FIG. 6C shows a double resolver of the prior art. FIG. 6D shows a multiple speed resolver system using the double resolver of FIG. 6C and a prior art gear mechanism. FIG. 6E illustrates the relationship between the output signals of the prior art double resolver of FIG. 6D.

In FIG. 6A, a motor structure 115, a second (No. 2) resolver structure and a first (No. 1) resolver structure are arranged in order from the right to left in the casing 106 of the motor. At the center of the casing 106, rotation axis 108 is supported by a bearing 107. On the rotation shaft 108, rotor 109 of the motor, rotor 110 of No. 2 VR resolver, and rotor 111 of the No. 1 VR resolver are axially spaced apart in order from right to left in FIG. 6A. In the casing 106, a stator 112 of the motor, a stator 113 of the No. 2 VR resolver and stator 114 of the No. 1 VR resolver are axially spaced in order from right to left in FIG. 6A in correspondence with the rotors 109, 110 and 111.

FIG. 6B shows the assembled redundant system using the resolvers in FIG. 6A. The No. 1 VR resolver and the No. 2 VR resolver have the same structure. The rotors 110, 111 have the same structure as well and a random nX-times axis angle can be employed.

The multiplied axis angle is defined to be 1X when a single rotation of the rotor can generate a cycle of a sine wave voltage. For example, n (random integer) cycles of the output sine signal that output from the stator secondary winding during one rotation (360°) of the axis is indicated as nX.

There are several types of stator coils. For example, in the case of a one phase excitation with a two phase output, a stator coil includes reference (Ref) windings 121 and 121' as the primary windings and sine windings 122 and 122' and cosine windings 123 and 123' as the two secondary windings. The sine and cosine windings have a phase difference of 90°. A reference signal of sin ωt is input to the sine windings 121 and 121'. Output signals of sin ωt sin θ and sin ωt cos θ, which are modified depending on the rotor rotation angle θ, are obtained for the sine windings 122 and 122' and cosine windings 123 and 123'.

Resolver-to-digital (R/D) converters 124 and 124' find sin (θ−φ) from the signals sin φ and cos φ that correspond to the standard rotation angle φ controlled by the voltage controlling oscillator (not shown) and the resolver output signal that includes the rotation angle θ. Phase locked loop (PLL) control is conducted to adjust the count value, which is equivalent to φ, so that the phase difference (θ−φ) becomes zero. At that time, the status when the PLL control converges, namely, φ at the state of (θ−φ)=0, is detected and output as the value of the rotation angle θ of the rotor.

The output of the primary (No. 1) resolver of the R/D converter 124 and the output of the secondary (No. 2) resolver of the R/D converter 124' in FIG. 6B are compared by the comparator 125. When deviation determined by the comparator 125 is not within a designated range, a failure is determined.

In addition, in order to detect an abnormality of the resolvers and R/D converters 124 and 124', the reference signal elements of the output signals of the resolver are removed, and detection is conducted to extract the modulating signals sin θ and cos θ that amplify and modulate the reference signals. Between these two modulating signals, in principle, there is a relationship of $\sin^2\theta + \cos^2\theta = 1$. The sum of squares of the sin θ and cos θ, which are extracted through the detection, is calculated. When the sum of squares falls below the designated threshold, abnormality of the resolver output signal is found.

This prior art double resolver system has problems when it is analyzed closely. Japanese Unexamined Patent Application Publication 2000-018968 provides a solution to the problem that, when the resolver coils of the same structure are provided on two stators that coaxially spaced apart, the axial length of the device increases. In the device of FIG. 6C, the resolver coil 130 is structured with at least a double system that includes a first resolver coil 132 and a second resolver coil 133, which are provided on the ring-shaped stator 131. The first resolver coil 132 and the second resolver coil 133 are provided on the ring-shaped stator 131 and are sectioned every 90°, and at the same time, they are provided in a facing position with a 180° difference on the ring-shaped stator 131.

The first and second resolver coils 132 and 133 structures are redundant. For example, the ring-shaped stator 131 maybe attached to a generator of a car engine, and the rotor 134 may be connected to the rotation axis of the generator. The rotation status of the generator is detected by the first resolver coil 132 as a difference in voltage, as is widely known in the art. If the first resolver coil 132 fails due to disconnection or the like, the rotation detection operation can be continued by switching to the second resolver coil 133, using a well-known switcher.

The double resolver structure is a structure employed not only for safety and reliability but also as a multiple speed detector in the field of resolvers. A variety of types of multiple speed detectors have been proposed. Among them, one shown in Japanese Unexamined Patent Application Publication 03-002262 has been proposed in terms of the space occupied. A built-in multi-pole multi-speed rotation detector is structured such that a multiplicity of resolvers, which output different speed signals from each other, are provided in the casing. The resolvers are combined with each other by a random gear ratio with the gear combining portion provided in the casing.

FIG. 6D is a schematic view of the multi-speed resolver of the prior art. As shown in FIG. 6D, the output of the first resolver 1 (142) that is directly connected to the rotation axis 141 becomes the nX resolver signal with a random nX-times axis angle. The output of the second resolver 2 (143) that is connected to the rotation axis 141 via the gear mechanism 144, by which the rotation number of the rotation axis 141 is reduced to 1/n, becomes the 1X resolver signal with a 1X-times axis angle.

FIG. 6E illustrates each of the resolver signals. FIG. 6E indicates the resolver output of the n-rotations of the (mechanical angle) input axis. In this case, the resolver output is a sine wave output, and the relationship between the sine signal wave of the 1X-times axis angle and the sine signal of the resolver with an nX-times axis angle is shown when n=2.

In Japanese Unexamined Patent Application Publication 2001-197610, two resolvers are used. In this device, the space occupied by the resolvers must be larger, and the control of the synchronized operation of two resolvers is difficult.

In Japanese Unexamined Patent Application Publication 2000-018968, the winding range of the stator windings of both resolvers is commonly regulated. Therefore, a problem has been that it is impossible to alternate the multiplied axis angle of the resolvers with each other.

In Japanese Unexamined Utility Model Application Publication 03-002262, there is a gear-combining device, and therefore the generation of a machining error is inevitable. In addition., the gear-combining device is provided on the joint of the axis and therefore, the axial length of the device is increased accordingly.

SUMMARY OF THE INVENTION

By taking the above-mentioned problems into account, the present invention has the objective of providing a double variable reluctance resolver in which a redundancy is given to a variable reluctance resolver (VR resolver) to improve the reliability. The double VR resolver also functions as a multiple speed resolver system.

In order to achieve the above-mentioned objective, for a VR resolver with a 1X-times axis angle, the output of the secondary windings, is compared to the output of corresponding groups of poles of an nX-times angle resolver. If the output is the same for one group, then the output is the same for all corresponding groups. In this case, the number of secondary windings is the same at each pole.

The reliability and safety of both resolvers can be detected by comparing the output of the secondary windings provided on the stator magnetic poles by using a double variable reluctance resolver with the aforementioned relationship. In addition, by using a double variable reluctance resolver with a different multiplied axis angle, the absolute digital rotation angle signal can be found specifically.

The present invention includes a double variable reluctance resolver characterized in that there exists a VR resolver with a 1X-times axis angle and a VR resolver with an nX-times axis angle. The resolvers are coaxial. The number of stator magnetic poles of the 1X-times axis resolver exists in a corresponding angle portion of the VR resolver with the nX-times axis angle. The VR resolver is coiled such that the output of the secondary windings provided on the stator magnetic pole for the 1X-times axis angle portion (the corresponding angle portion mentioned above) of the VR resolver with an nX-times axis angle is the same as the output of the secondary winding of the corresponding stator magnetic poles of the 1X-times axis angle VR-resolver.

In another aspect of the invention, the double variable reluctance resolver is characterized in that the number of coils of all the secondary windings for each VR resolver is set to be the same. In addition, the rotors of both of the VR resolvers are formed so that the output of the secondary windings provided on the corresponding stator magnetic poles of the VR resolvers are the same.

In another aspect of the invention, the double variable reluctance resolver is characterized in that the VR resolvers are coaxially stacked so that the stator magnetic poles of the VR resolvers are shifted so that they do not overlap or share the same magnetic pole positions.

In another aspect of the invention, the double variable reluctance resolver is characterized in that the stator magnetic poles of the VR resolvers are provided in an alternating fashion by one magnetic pole at a time so that they do not overlap or share the same magnetic pole positions.

In another aspect of the invention, the double variable reluctance resolver is characterized in that the stator magnetic poles of both of the VR resolvers are provided in a range of 90° with a mechanical angle so that they do not overlap or share the same magnetic pole positions.

In another aspect of the invention, the double variable reluctance resolver is characterized in that the rotors of the VR resolvers are coaxial.

In another aspect of the invention, a multiple speed resolver system is characterized in that the output of a VR resolver with a 1X-times axis angle and a VR resolver with an nX-times axis angle is found by having one rotation of each rotor correspond. The output is converted to a triangular wave using a resolver digital converter, and then the rotation angle is found from the triangular wave based on the output value of both VR resolvers during the measurement.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

The double VR resolver of the present invention is described in detail by referring to the attached drawings as follows. First, the structure of the redundancy means using two resolvers with different multiplied axis angles is described. Then, the structure of a stator for duplication that takes the automatic winding into account is described. Next, the structure of the rotor for doubling that takes the automatic winding into account is described. Finally, the structure of a multiple-speed resolver is described.

The double VR resolver is in principle, comprised of a combination of a VR resolver with a 1X-times axis angle and a VR resolver with an nX-times axis angle (n is a random natural number other than 1).

Figure 1A:
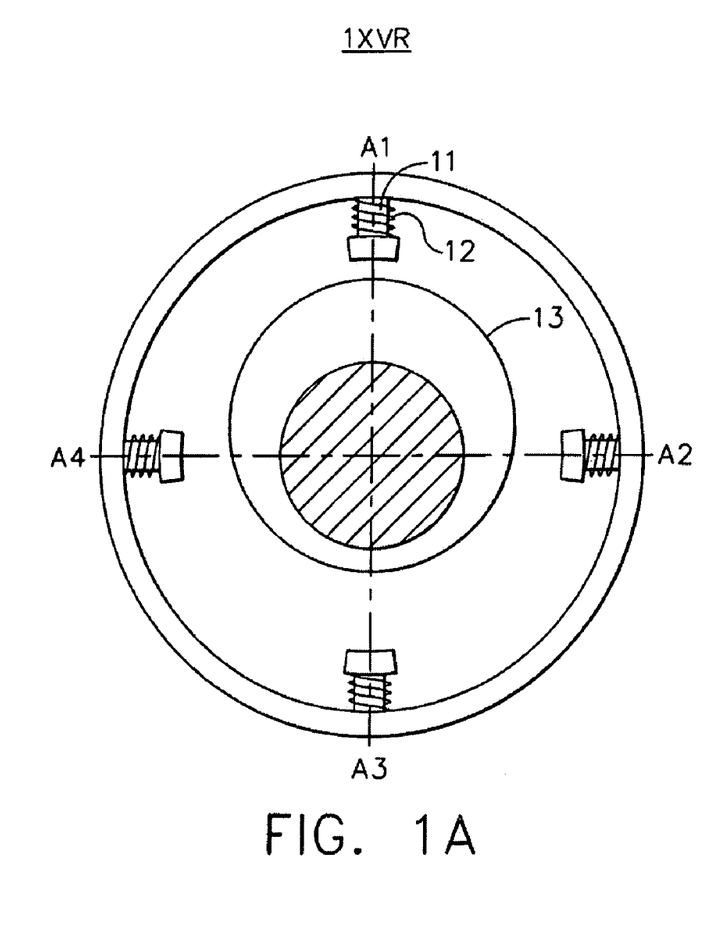
FIG. 1A is a cross sectional view of a VR resolver with a 1X-times axis angle according to a first embodiment of the invention.
Figure 1B:
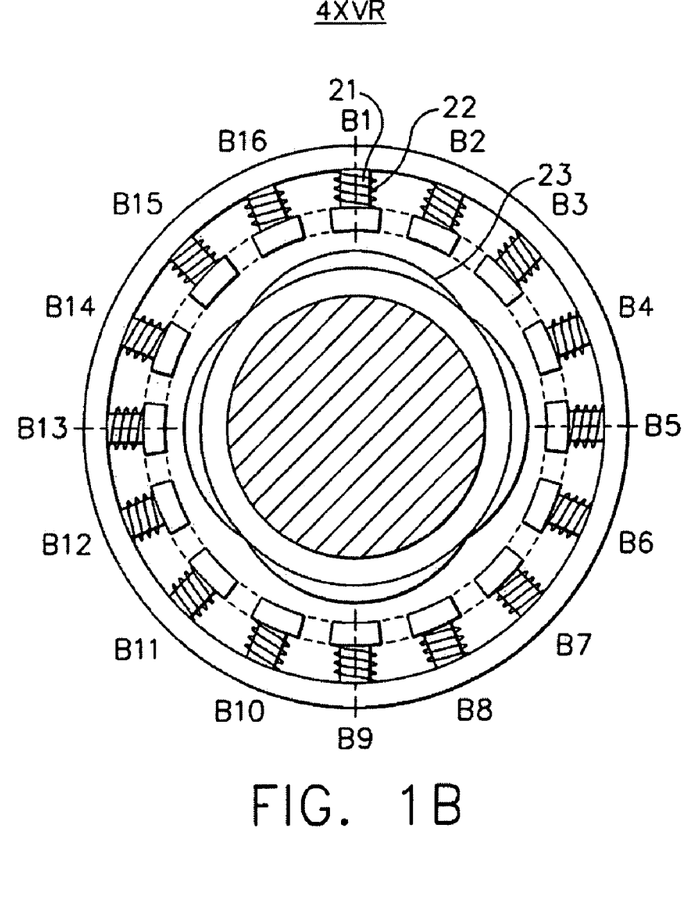
FIG. 1B is a cross sectional view of a VR resolver with a 4X-times axis angle according to a first embodiment of the invention.

FIGS. 1A and 1B show a first embodiment of the invention. FIG. 1A shows a VR resolver with a 1X-times axis angle and FIG. 1B shows a VR resolver with a 4X-times axis angle (FIG. 1B is example of an nX-times axis angle resolver).

Figure 2A:
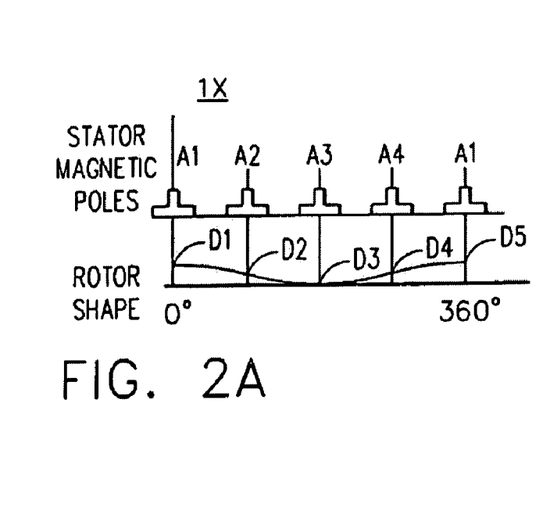
FIG. 2A is a diagram that shows the correlation between the rotor shape and the magnetic pole in FIG. 1A.
Figure 2B:
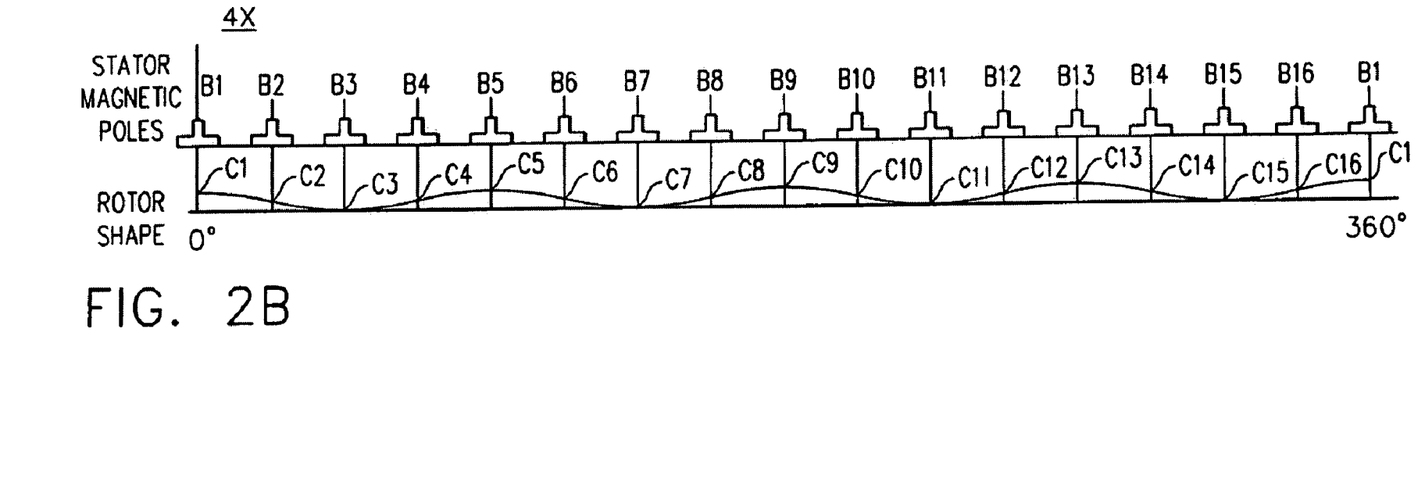
FIG. 2B is a diagram that shows the correlation between the rotor shape and the magnetic pole in FIG. 1B.

FIGS. 2A and 2B schematically show the relationship between the rotor shape and the magnetic poles in FIGS. 1A and 1B, respectively. FIGS. 2A and 2B show the distances from the surfaces of the stator magnetic poles to the external face of the rotor. The gap permeance between the rotor and the stator is virtually shown in FIGS. 2A and 2B.

For a VR resolver with a 1X-times axis angle, the correlation between the number of secondary windings 12, which are provided for every stator magnetic pole 11, and the outputs that correspond to the order (in the direction of the rotation of the rotor) of the secondary windings 12 is compared to the correlation between the number of secondary windings 12 that are provided for every stator magnetic pole 11 of every 1X-times axis angle minute and the outputs that correspond to the order of the secondary windings 12. If the correlation is the same, then, correlation exists for all the nX-times axis angle minutes.

For convenience, the number of windings of the secondary windings 12 for all the stator magnetic poles 11 is the same. Based on this, the output of the secondary windings 12 of the stator magnetic poles 11 is proportional to the distance from the surface of the stator magnetic pole 11 to the external lateral face of the rotor 13. That is, the output of the secondary windings 12 is related to the rotor shape.

For the rotor shape of FIG. 1A, in principle, a 1X-times axis angle (one pole) shape is employed. The rotor shape of FIG. 1A is formed in a symmetrical random shape, for example, in an oval shape.

As shown in FIG. 1A, a normal VR resolver can create a resolver signal with four stator magnetic poles 11 in the case of a 1X-times axis angle. The number of stator magnetic poles 11 is determined based on the number of magnetic poles that can be practically arranged on the resolver with a large multiplied axis angle.

When the relationship between the pole positions and the rotor shape, as shown in FIG. 2A, can be produced in both resolvers, a comparison of the two resolvers can be made. Therefore, the number and location of the stator magnetic poles and the rotor shape in the resolver of FIG. 1B is determined to produce the relationship shown in FIG. 2A.

The rotor shape positions D1 (0°), D2, D3, D4 and D5 (360°) of FIG. 2A correspond to the stator magnetic pole positions A1 (0°), A2, A3, A4 and A1 (360°) of FIG. 2A. The diagrams of FIGS. 2A and 2B indicate the distance from the surface of the stator magnetic poles to the external face of the rotor, which is determined by the rotor shape. Stator magnetic pole positions B1, B2, B3, B4, and B5 in FIG. 1B correspond to the stator magnetic poles 21 of the 1X resolver of FIG. 1A. Thus, a portion or range of the magnetic poles of the resolver in FIG. 1B correspond to the magnetic poles of the resolver in FIG. 1A.

Therefore, the output of the secondary winding 12 of the stator magnetic poles 11 at the positions A1 (0°), A2, A3, A4, and A1 (360°) of the VR resolver with a 1X-times axis angle, and the output of the secondary winding 22 of the stator magnetic poles 21 at the positions B1, B2, B3, B4 and B5 of the VR resolver with 4X-times axis angle are the same.

In FIG. 2A, the rotor rotation (mechanical rotation angle) from D1 (0°) to D5 (360°) is equally divided into four (4). Therefore, the D3 position has the lowest output, the D1 position has the highest output, and the D2 and D4 positions have the same value.

In FIG. 2B, the rotor rotation (mechanical rotation angle) from C1 (0°) to C5 is equally divided into four (4). Therefore, the C1 (0°) position and the C5 position have the highest output, the C3 position is the lowest output and the C2 and C4 positions have the same output value.

When the same value is set for the highest resolver output of both resolvers, the rotor positions of the resolvers correspond with each other. For example, the resolver outputs (secondary winding) at the D1 (0°) (or D5 (360°)) positions and C1 (0°) and C5 positions become the same. The resolver outputs (secondary winding) at the D2 and D4 positions and C2 and C4 positions become the same. The resolver outputs (secondary winding) at the D3 position and C3 position become the same as well.

The rotor positions between C5 and C9, C9 and C13, and C13 and C1 (360°) in FIG. 2B have the same outputs as those between the rotor positions D1 (0°) to D5 (360°) in FIG. 2A and C1 (0°) and C5 in FIG. 2B. Table 1 shows a summary.

TABLE 1

| Pole Order | Rotor shape | | | | |
| --- | --- | --- | --- | --- | --- |
| | 1X | 4X | | | |
| 1 | D1 (0°) | C1 (0°) | C5 | C9 | C13 |
| 2 | D2 | C2 | C6 | C10 | C14 |
| 3 | D3 | C3 | C7 | C11 | C15 |
| 4 | D4 | C4 | C8 | C12 | C16 |
| 5 | D1 (360°) | C5 | C9 | C13 | C1 (360°) |

The number of stator magnetic poles of the VR resolver having the greater number of poles is set to be an integer multiple of the number of stator magnetic poles of the VR resolver having the fewer number of stator magnetic poles. When the multiplied axis angle of first resolver is 1X, as shown in FIG. 1A, the multiplied axis angle the other VR resolver, shown in FIG. 1B, is an integer multiple of X other than 1X. For example, in the case of 4X, as shown in FIG. 1B, 4 poles×4=16 poles.

As a first condition, the number of magnetic poles of the resolver with the larger number of magnetic poles is set to be an integer multiple of the number of magnetic poles of the resolver with fewer magnetic poles. With the first condition, the number of magnetic poles can correspond to every 1X unit.

As a second condition, the space between the surface of the stator magnetic poles and the external surfaces of the rotors is set to produce the same outputs for the corresponding magnetic pole positions of the two resolvers. With the second condition, the position of the stator magnetic poles for the 1X-times axis angle unit corresponds to the rotor shape.

The relationship shown in FIGS. 2A and 2B exists for any set of resolvers where the resolver with the greater number of magnetic poles has an nX-times axis angle. As long as the positional relationship of the rotor and stator magnetic poles is established, the position of the stator magnetic poles does not matter. Therefore, Redundancy can be accomplished using two resolvers with different multiplied axis angles.

To conduct a test of reliability and safety, the number of magnetic poles of both stators of a VR resolver with a 1X-times axis angle and a VR resolver with an nX-times axis angle are correlated for every 1X-times axis angle unit. Then, the position of the stator magnetic poles for the 1X-times axis angle portion and the rotor shape are correlated. Next, the outputs of the secondary winding of the correlated magnetic poles are compared. If the comparison is within a designated range, then the resolvers are normal. However, if the comparison is outside of the designated range, the resolvers are determined to be abnormal.

The output of the stator coil was described to be in proportion to the value of the distance from the surface of the stator magnetic pole to the external lateral face of the rotor. For convenience, in this description, all the winding numbers of the stator coils are the same.

In a modification of FIG. 1A, the rotor shape may be a round gear. The number of stator coil windings may then be set for a coil output that corresponds to the value of the rotor shape in FIG. 2A.

In the modification, the rotor is round. In other words, the gap between the stator magnetic pole surface and the outer surface of the gear on the circumference of the surface of the rotor is set to be equal over the whole 360°. Also, the number of windings of the stator magnetic pole is set for a coil output that corresponds to a reversal of the rotor shape property curve in FIG. 1A. Namely, the value of D3 is set as the standard (zero level) and the value of D1 is set to be the highest value.

The following is a discussion of a stator structure for a redundant resolver that takes automatic winding into account.

Automatic winding generates a volume (thickness) in the windings. Therefore, the winding projects outside both sides of the stator yoke, and consequently, it is difficult to stack the stator yoke by arranging them closely together. The present invention solves this problem of the thickness of the winding by a method that does not have windings located at the same magnetic pole positions.

To conform with the automatic windings, a stator shown in FIGS. 1A and 1B is structured by laminating a multiplicity of stator yokes in which the stator magnetic poles are partially and fundamentally arranged. Also, a multiplicity of rotors are arranged in order to conform with this stator. That is, the rotors correspond to the stator yokes in which stator magnetic poles are partially arranged. In the two embodiments of FIGS. 3A to 3H, each stator has a structure in which two stator yokes A, B are laminated.

FIGS. 3A to 3D are illustrations of an embodiment in which stator magnetic poles that are arranged along the circumference are provided at alternating positions. That is, the magnetic pole positions of first resolver alternate with those of a second resolver. FIGS. 3E to 3H are illustrations of an embodiment in which stator magnetic poles that are arranged along the circumference are provided in groups at designated angle ranges on each resolver. The stator structures described in FIGS. 3A–3H are to be combined with the rotor structure that is described later.

To select the position where the thickness of the winding due to the winding machine projects beyond the thickness of the stator yoke, it is necessary to widen the space between adjacent magnetic poles, or to limit the winding range. Therefore, a condition where the magnetic poles of the first resolver do not overlap with the magnetic poles of the second resolver. That is, the magnetic poles of the first resolver are not in axial alignment with those of the second resolver.

First, the case where the space between adjacent magnetic poles is widened is described.

Figure 3A:
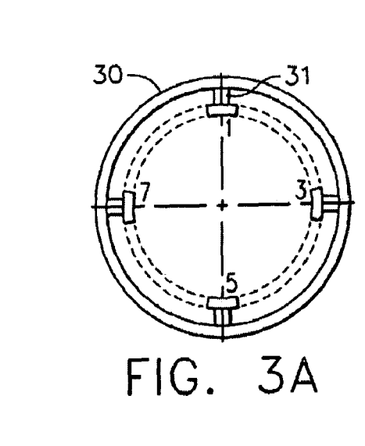
FIG. 3A is an axial view diagram of a first resolver stator in which stator magnetic poles are arranged along the circumference at every other pole position.
Figure 3B:
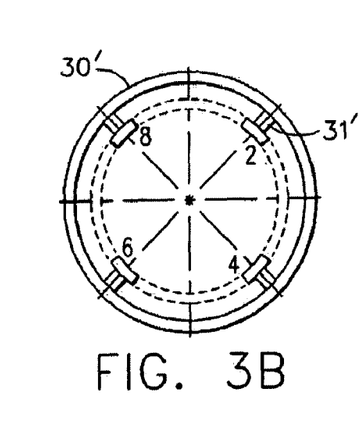
FIG. 3B is axial view diagram of a second resolver stator in which stator magnetic poles are arranged along the circumference at every other pole position.
Figure 3C:
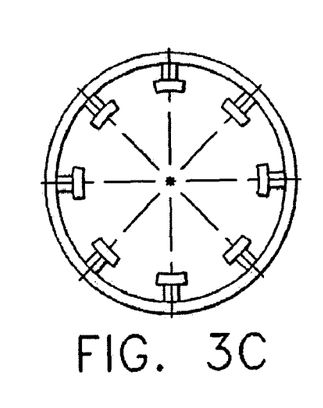
FIG. 3C is an axial view diagram where the first resolver stator of FIG. 3A and the second resolver stator of FIG. 3B are stacked.

The stator magnetic poles 31 of the first resolver in FIG. 3A are arranged so that in the clockwise direction, magnetic pole 1 is at the 0° position, magnetic pole 3 is at the 90° position, magnetic pole 5 is at the 180° position, and magnetic pole 7 is at the 270° position. The stator magnetic poles 31' of the second resolver in FIG. 3B are arranged so that in the clockwise direction, magnetic pole 2 is at the 45° position, magnetic pole 4 is at the 135° position, magnetic pole 6 is at the 225° position, and magnetic pole 8 is at the 315° position. FIG. 3C shows the condition where the stator yoke 30 of the first resolver and the stator yoke 30' of the second resolver are stacked in a coaxial manner.

Figure 3D:
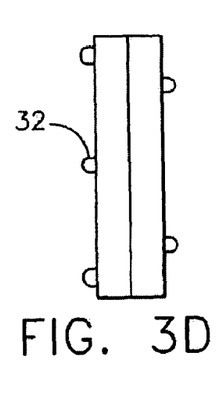
FIG. 3D is a side view of the stack of FIG. 3C showing portions of the stator coils that project from the sides of the stators.

After automatic winding by an automatic winding machine is conducted for stator magnetic poles 31 and 31' in FIG. 3A and FIG. 3B, the two stator yokes 30 and 30' are stacked coaxially in the position shown in FIG. 3C. Portions 32 of the stator coils project from the end faces of the stator yokes 30, 30' as shown in FIG. 3D. The stator magnetic poles 31 and 31' of the resolvers are not arranged at the same mechanical angle position (the same magnetic pole position), and therefore, there is no interference between the stator coils 32 that project from the stator magnetic poles 31 and 31'. Consequently, as shown in FIG. 3D, the stator yokes can be stacked closely with each other. In contrast, if automatic winding is carried out for magnetic poles at the same mechanical angle (the same magnetic pole position), the stator yokes 30 and 30' cannot be stacked closely with each other due to the thickness of the projecting portions 32 of the stator coils, and the output of the resolvers may be inappropriate.

Next, the case where the winding range is limited is described n.

Stator magnetic poles can be arranged in groups in designated areas. In this case, a first group of stator magnetic poles 31'' have to be arranged so that they do not overlap with a second group of poles 31''' when a first resolver 30'' is coaxially stacked with a second resolver 30'''. Therefore, in principle, the first group 31'' cannot be arranged in the range of 0° to 180°. However, as long as they are in this range or below and do not overlap, they can be arranged in two areas. From a practical point of view, for example, when they are arranged in the range of 0° to 90°, and 180° to 270°, the necessary position measurement is allowed. Other ranges for example, 90° to 180°, and 270° to 360° overlap at both ends, and therefore, the magnetic poles cannot be arranged in these positions. Setting the automatic winding range by an automatic winding machine to be within a range of 90° facilitates the operation because the angle range is narrow.

Figure 3E:
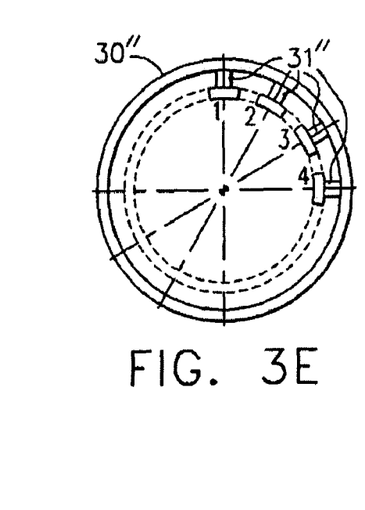
FIG. 3E is an axial view diagram in which stator magnetic poles are arranged along the circumference of a first resolver stator in designated angle ranges.

The first group of magnetic poles 31'' in FIG. 3E are arranged so that in the clockwise direction, magnetic pole 1 is at the 0° position, magnetic pole 2 is at the 30° position, magnetic pole 3 is at the 60° position, and magnetic pole 4 is at the 90° position.

Figure 3F:
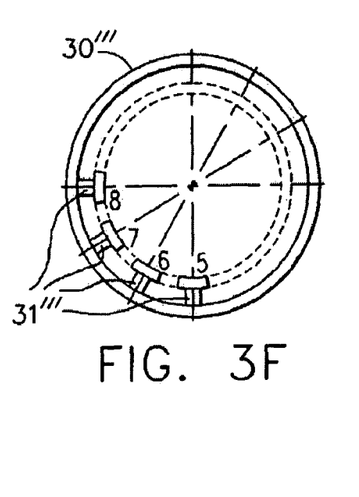
FIG. 3F is an axial view diagram in which stator magnetic poles are arranged along the circumference of a second resolver stator in designated angle ranges.

The second group of stator magnetic poles 31''' in FIG. 3F are arranged so that in the clockwise direction, magnetic pole 5 is at the 180° position, magnetic pole 6 is at the 210° position, magnetic pole 7 is at the 240° position, and magnetic pole 8 is at the 270° position.

Figure 3G:
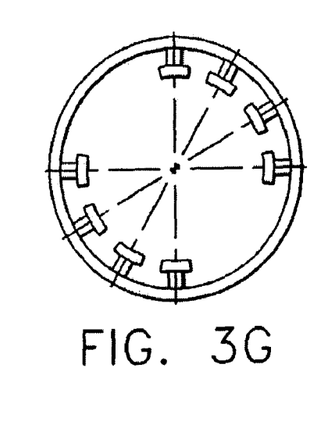
FIG. 3G is an axial view diagram in which the first resolver stator of FIG. 3E and the second resolver stator of FIG. 3F are stacked.

FIG. 3G shows the condition when the stator yokes 30'' of the first resolver and the stator yokes 30''' of the second resolver are stacked coaxially.

Figure 3H:
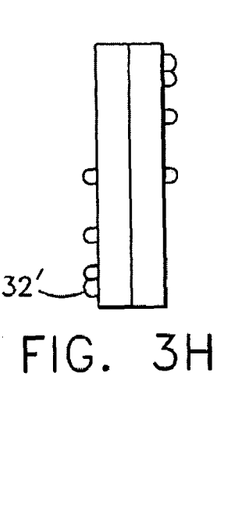
FIG. 3H is a diagrammatic side view of the stack of FIG. 3G that shows portions of the stator coils that project from the sides of the stators.

After automatic winding by an automatic winding machine is conducted for both groups of stator magnetic poles 31'' and 31'' of FIG. 3E and FIG. 3F, the stator yokes 30'' and 30''' are stacked in the position shown in FIG. 3G. Then, portions 32' of the stator coils project from the end faces of the stator yokes 30'' and 30''' as shown in FIG. 3H. Here, stator magnetic poles 31'' and 31''' of the first and second resolvers are not arranged at the same mechanical angle position (the same magnetic pole position). Therefore, there is no interference between the stator coil projections 32'.

In addition, a variety of alternative modes can be considered. A redundant stator structure that takes automatic winding into account requires a condition in which at least the position of the stator magnetic poles on one resolver are not arranged at the same mechanical angle position (the same magnetic pole position) as the magnetic poles of the other resolver.

A redundant rotor structure that takes automatic winding into account is described below. A rotor structure that corresponds to stacked stator yokes includes multiple rotors is arranged in correspondence to the stator yokes. As shown in FIG. 3D and FIG. 3H, the laminated stator structure of the double resolver is formed in the direction of the axis of the rotor shaft. To correspond to this, the rotor structure is also formed in the direction of the axis of the rotor shaft.

Figure 4A:
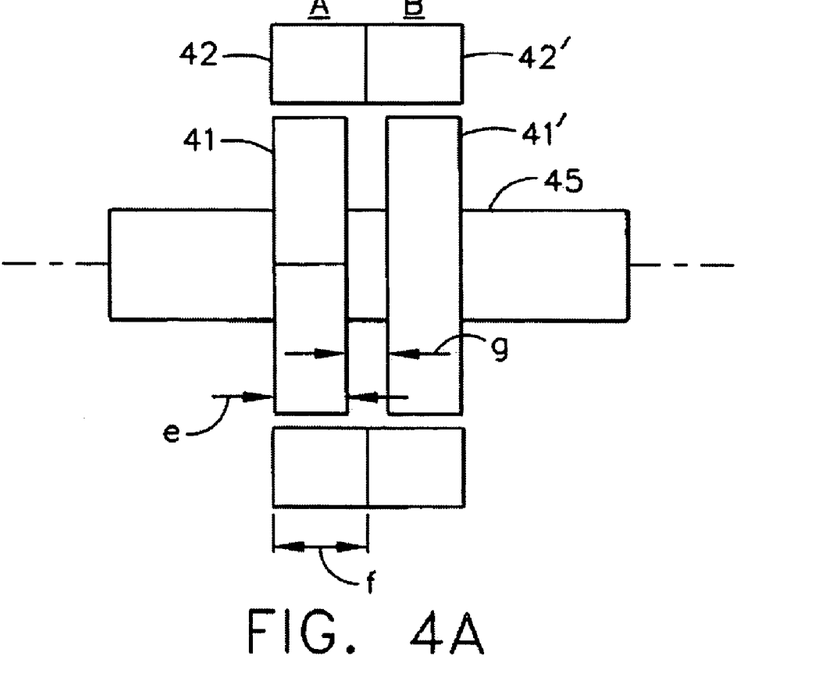
FIG. 4A is a side view that shows a rotor structure that is divided into a first rotor and a second rotor, which are spaced apart in the direction of the axis according to a further embodiment of the invention.
Figure 4B:
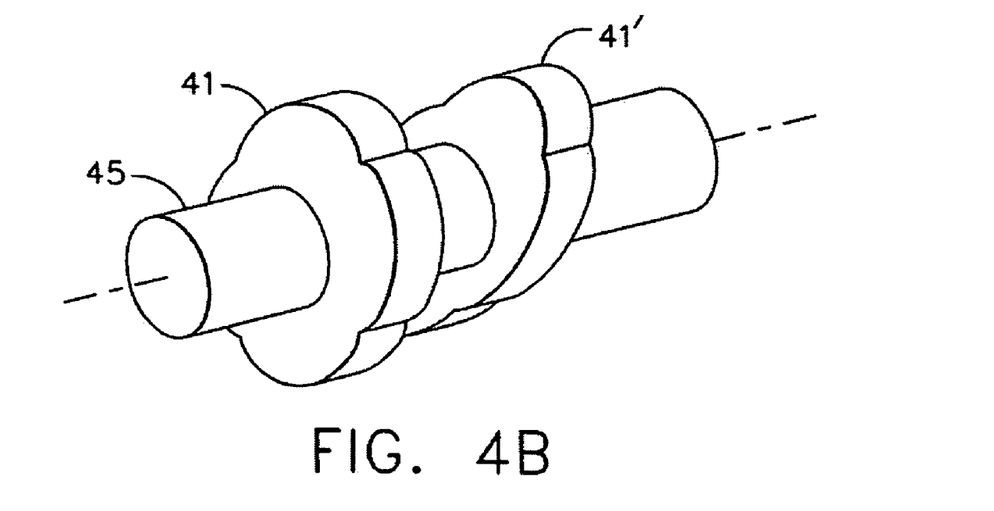
FIG. 4B is a perspective view of the rotor structure of FIG. 4A.
Figure 4C:
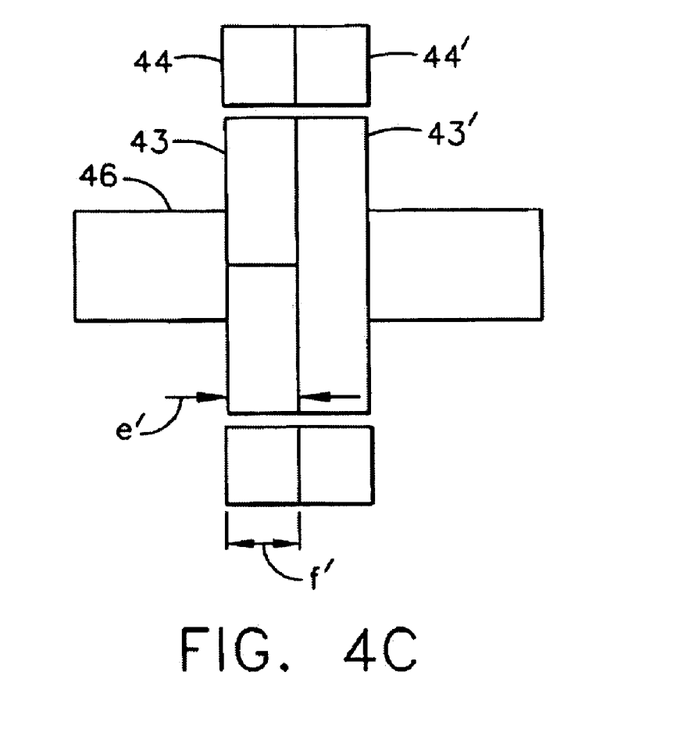
FIG. 4C is a side view that shows a rotor structure that has a unified pair of rotors including a first rotor and a second rotor, where the rotors are arranged in the direction of the axis without a gap between them according to a further embodiment of the invention.

FIGS. 4A to 4D show double rotors that take automatic winding into account. FIG. 4A shows a rotor structure that includes a first rotor 41 and a second rotor 41'. FIG. 4C shows a rotor structure that includes unified first and second rotors 43, 43'.

In FIG. 4A and FIG. 4B, a first rotor 41 and second rotor 41' are arranged in the direction of the axis of the rotor shaft 45 with a small gap g between them. The rotor width e is such that it is less than the stator width f. Each rotor 41 and 41' is arranged within the width of the corresponding stator 42 and 42'. In this embodiment, there is a gap g between the rotors 41 and 41'. Therefore, the generated magnetic flux of each stator coil is transmitted to each rotor 41 and 41' without being transmitted through the gap g, which has a large magnetic resistance. This allows more effective use of the magnetic flux.

Figure 4D:
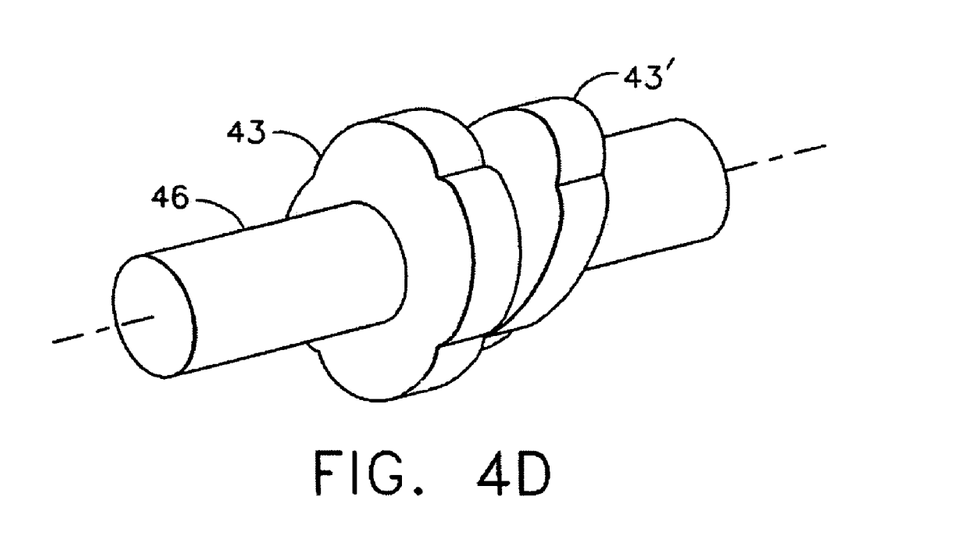
FIG. 4D is a perspective view of the rotor structure of FIG. 4C.

In FIGS. 4C and 4D, a first rotor 43 and a second rotor 43' are arranged in the axial direction of the rotor shaft 46 and are fitted against one another. The rotor width e' and the stator width f' are the same.

The first rotor 43 and the second rotor 43' are close together in the direction of the axis of the rotor shaft, which ensures that the mechanical phase difference between the rotors is maintained through a bonding process.

The shape of the circumferential surface of each rotor 43, 43', namely, the salient pole shape, is arranged over a 360° mechanical angle. The shape of the circumferential surface of each rotor is repeated in correspondence to the position of the stator magnetic poles using a salient pole shape with a smaller multiplied axis angle as the standard.

Figure 5B:
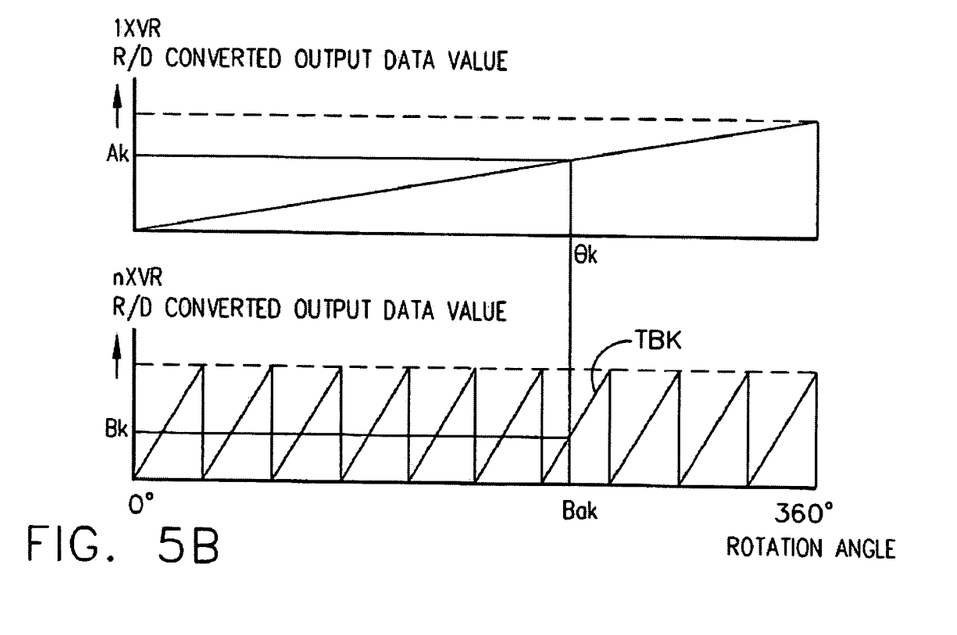
FIG. 5B is a graph that shows the R/D conversion output data of the resolvers of FIG. 5A.

FIG. 5A is a block diagram of a multiple speed resolver system. FIG. 5B is a graph that shows the R/D conversion output data of the resolvers.

In FIG. 5A, the multiple speed resolver system includes a multiple speed resolver 51 and a digital converter 52. The multiple speed resolver 51 has a first VR resolver 53 with a 1X-times axis angle and a second VR resolver 54 with an nX-times axis angle. The digital converter 52 has an R/D (resolver/digital) converter 55 and 55' and a synthesizing circuit 56.

An eccentric rotor 57 is rotated while a reference signal is input to the first VR resolver 53 with a 1X-times axis angle 53. A sine wave signal and cosine wave signal are output from the output winding of the stator of the first resolver 53. The rotation angle of the eccentric rotor 57 is related to the gap between the excitation magnetic pole and eccentric rotor 57. The sine wave signal is converted to linear output data (triangular wave signal) by the R/D converter 55, as shown in FIG. 5B.

In addition, a multi-pole rotor 58 is rotated while the reference signal is input. A sine wave signal and cosine wave signal, which are based on the rotation angle of the multi-pole rotor 58 are output from the stator output winding of the second (multi-pole) VR resolver 54, which has an nX-times axis angle. The output is converted to linear output data (triangular wave signals) that correspond to the poles by the R/D converter 55'.

As shown in FIG. 5B, the operation of the system takes in the initial positional data Ak and Bk of the 1X resolver 53 and nX resolver 54 that correspond to the initial position θk. Then an initial pole TBk (linear output data) of the nX resolver 54 is calculated from the initial positional (θk) data Ak of the 1X resolver 53. From the initial pole TBK and the initial positional data Bk of the nX resolver 54, the absolute digital rotation positional data Bak is found.

After that, every time a designated period of time passes, output data Bk from the multi-pole resolver 54 is taken in, and the above calculation is carried out and the rotation positional data at each time is found.

The present invention has the following advantages. For a VR resolver with a 1X-times axis angle, the correlation between the number of secondary windings that is provided for every stator magnetic pole, and the outputs that correspond to the order (in the direction of the rotation of the rotor) of the secondary windings, is compared to the correlation between the number of secondary windings that are provided for every stator magnetic pole of every 1X-times axis angle minute, and the outputs that correspond to the order of the secondary windings. If the correlation is the same, then, correlation exists for all the nX-times axis angle minutes. In this case, the number of secondary windings is the same as the number of magnetic poles.

Therefore, the reliability and safety of the resolvers can be detected by comparing the output of the secondary windings provided on the stator magnetic poles by using a double variable reluctance resolver with the above correlation. In addition, by using a double variable reluctance resolver with a different multiplied axis angle, the absolute digital rotation angle signal can be found.

Further, a double variable reluctance resolver can be obtained wherein the two VR resolvers are coaxially stacked so that the stator magnetic poles of the VR resolvers are angularly shifted such that they do not overlap or share the same magnetic pole position. This allows automatic winding using an automatic winding machine to be carried out.

Furthermore, a double variable reluctance resolver is obtained ensuring the positional relationship of the rotors.

In addition, in a multiple speed resolver system of the present invention, the outputs of a VR resolver with a 1X-times axis angle and a VR resolver with an nX-times axis angle, in which one rotation of each rotor correspond, is converted to a triangular wave using a resolver digital converter. Then, the rotation angle is found from the triangular wave based on the output values of the VR resolvers during the measurement, allowing the finding of the absolute digital rotation angle.

The invention claimed is:

1. A double variable reluctance resolver comprising:
a first VR resolver, wherein the first VR resolver includes a first plurality of stator magnetic poles and a first rotor, and the first plurality of stator magnetic poles is distributed over an angular range of the first VR resolver;
a second VR resolver, wherein the second VR resolver includes a second plurality of stator magnetic poles and a second rotor, wherein a predetermined group of the poles of the second plurality of stator magnetic poles correspond to the first plurality of stator magnetic poles, and the predetermined group of poles is distributed over an angular range of the second VR resolver, and windings of the first VR resolver are coiled such that, over the angular range of the first plurality of stator magnetic poles, the output of secondary windings provided on the first plurality of stator magnetic poles is substantially the same as the output of the predetermined group of stator magnetic poles over the angular range of the predetermined group of stator magnetic poles, wherein the number of stator magnetic poles in the second plurality is an integer multiple, other than one, of the number of poles in the first plurality.

2. The double variable reluctance resolver according to claim 1, wherein the first and second rotors are coaxial.

3. The double variable reluctance resolver according to claim 1, wherein the first and second rotors are fixed to one another and rotate as a unit.

4. The double variable reluctance resolver according to claim 1, wherein the number windings on each stator magnetic pole of the first VR resolver is the same as the number of windings on each stator magnetic pole of the second VR resolver.

5. The double variable reluctance resolver according to claim 4, wherein the first and second rotors are coaxial.

6. The double variable reluctance resolver according to claim 4, wherein the first and second VR resolvers are stacked so that each stator magnetic pole of the first plurality is angularly offset from the stator magnetic poles of the second plurality.

7. The double variable reluctance resolver according to claim 6, wherein the first and second rotors are coaxial.

8. The double variable reluctance resolver according to claim 1, wherein the output of the secondary windings of the first VR resolver corresponds to the rotor shape.

9. The double variable reluctance resolver according to claim 8, wherein the first and second rotors are coaxial.

10. The double variable reluctance resolver according to claim 1, wherein the first and second VR resolvers are stacked so that each stator magnetic pole of the first plurality is angularly offset from each stator magnetic pole of the second plurality.

11. The double variable reluctance resolver according to claim 10, wherein the first plurality occupies an angular range of 90° and the second plurality occupies an angular range of 90°.

12. The double variable reluctance resolver according to claim 10, wherein the first and second rotors are coaxial.

13. The double variable reluctance resolver according to claim 10, wherein the double resolver has a plurality of angular stator magnetic pole positions, and every other magnetic pole position is occupied by a stator magnetic pole of the first plurality, and magnetic poles of the second plurality are located between the poles of the first plurality, such that the stator magnetic poles alternate between a pole of the first plurality and a pole of the second plurality in the circumferential direction.

14. The double variable reluctance resolver according to claim 13, wherein the first and second rotors are coaxial.

15. The double variable reluctance resolver according to claim 1, wherein each pole of the predetermined group is adjacent to another pole of the predetermined group in a circumferential direction.

16. The double variable reluctance resolver according to claim 1, wherein the output of the first plurality of stator magnetic poles and the output of the predetermined group of poles are sinusoidal, and the output of the first plurality of stator magnetic poles, over the angular range of the first plurality of stator magnetic poles, has the same number of cycles as the output of the predetermined group over the angular range of the predetermined group.

17. A multiple speed resolver system, comprising:
a first VR resolver, wherein the first VR resolver includes a first plurality of stator magnetic poles and a first rotor, and the first plurality of stator magnetic poles is distributed over an angular range of the first VR resolver;
a second VR resolver, wherein the second VR resolver includes a second plurality of stator magnetic poles and a second rotor, the second VR resolver is coaxial with the first VR resolver, the second plurality of magnetic poles include groups of stator magnetic poles such that each group of stator magnetic poles corresponds to the first plurality, and wherein each group of stator maanetic poles of the second plurality is distributed over an angular range of the second VR resolver, and the output of windings of each group of stator magnetic poles over the angular range of each one of the groups matches the output of windings of the first plurality over the angular range of the first plurality.

18. The multiple speed resolver system according to claim 17, wherein the number windings on each stator magnetic pole of the first VR resolver is the same as the number of windings on each stator magnetic pole the second VR resolver.

19. The multiple speed resolver system according to claim 17, wherein the output of the secondary windings of the first VR resolver corresponds to the rotor shape.

20. The multiple speed resolver system according to claim 17, wherein the first and second VR resolvers are stacked so that each stator magnetic pole of the first plurality is angularly offset from each stator magnetic pole of the second plurality.

21. The multiple speed resolver system according to claim 17 further comprising a resolver to digital converter for converting an output value of the first and second VR resolvers to a triangular wave, wherein the rotors rotate together as a unit, and a rotation angle of the rotors can be determined from the triangular wave.

22. The multiple speed resolver system according to claim 17, wherein each pole of each group is adjacent to another pole of the same group in a circumferential direction.

23. The multiple speed resolver system according to claim 17, wherein the output of the first plurality of stator magnetic poles and the output of any of the groups of poles are sinusoidal, and the output of the first plurality of stator magnetic poles, over the angular range of the first plurality of stator magnetic poles, has the same number of cycles as the output of any one of the groups over the angular range of said any one group.

* * * * *

UNITED STATES PATENT AND TRADEMARK OFFICE
CERTIFICATE OF CORRECTION

PATENT NO. : 7,157,906 B2  Page 1 of 1
APPLICATION NO. : 10/832470
DATED : January 2, 2007
INVENTOR(S) : Miya It is certified that error appears in the above-identified patent and that said Letters Patent is hereby corrected as shown below:

Column 13, line 21-35 and column 14, line 1-3, delete claim 17, and insert:

--17. A multiple speed resolver system, comprising:

a first VR resolver, wherein the first VR resolver includes a first plurality of stator magnetic poles and a first rotor, and the first pluralityof stator magnetic poles is distributed over an angular range of the first VR resolver;

a second VR resolver, wherein the second VR resolver includes a second plurality of stator magnetic poles and a second rotor, the second VR resolver is coaxial with the first VR resolver, the second plurality of magnetic poles include groups of stator magnetic poles such that each group of stator magnetic poles corresponds to the first plurality, and wherein each group of stator magnetic poles of the second pluralityis distributed over an angular range of the second VR resolver, and the output of windings of each group of stator magnetic poles over the angular range of each one of the groups matches the output of windings of the first plurality over the angular range of the first plurality.--.

Signed and Sealed this

Twenty-ninth Day of May, 2007

JON W. DUDAS
*Director of the United States Patent and Trademark Office*